United States Patent
Kokeguchi

(10) Patent No.: US 7,773,285 B2
(45) Date of Patent: Aug. 10, 2010

(54) DISPLAY ELEMENT AND PRODUCTION METHOD THEREOF

(75) Inventor: Noriyuki Kokeguchi, Tokyo (JP)

(73) Assignee: Konica Minolta Holdings, Inc. (JP)

( * ) Notice: Subject to any disclaimer, the term of this patent is extended or adjusted under 35 U.S.C. 154(b) by 111 days.

(21) Appl. No.: 12/093,545

(22) PCT Filed: Oct. 30, 2006

(86) PCT No.: PCT/JP2006/321605

§ 371 (c)(1),
(2), (4) Date: May 13, 2008

(87) PCT Pub. No.: WO2007/058063

PCT Pub. Date: May 24, 2007

(65) Prior Publication Data

US 2009/0180170 A1  Jul. 16, 2009

(30) Foreign Application Priority Data

Nov. 17, 2005  (JP) .............................. 2005-332669

(51) Int. Cl.
*G02F 1/153* (2006.01)
*G02F 1/15* (2006.01)

(52) U.S. Cl. .................. 359/270; 359/267; 359/265

(58) Field of Classification Search ................. 205/122; 359/265, 267, 270
See application file for complete search history.

(56) References Cited

U.S. PATENT DOCUMENTS

| | | | |
|---|---|---|---|
| 4,240,716 A | 12/1980 | Camlibel et al. | |
| 7,184,198 B2 * | 2/2007 | Kokeguchi et al. | 359/296 |
| 7,324,259 B2 * | 1/2008 | Kokeguchi et al. | 359/265 |
| 7,518,777 B2 * | 4/2009 | Kokeguchi | 359/270 |
| 7,602,543 B2 * | 10/2009 | Kokeguchi | 359/267 |
| 2005/0206994 A1 | 9/2005 | Kokeguchi et al. | |
| 2009/0091234 A1 * | 4/2009 | Kokeguchi | 313/358 |

FOREIGN PATENT DOCUMENTS

| | | | |
|---|---|---|---|
| EP | 1950607 A1 * | 7/2008 | |
| JP | 2003-511719 T | 3/2003 | |
| JP | 3-428603 B2 | 5/2003 | |
| JP | 2003-241227 A | 8/2003 | |
| JP | 2005-266652 A | 9/2005 | |
| WO | 0125845 A1 | 4/2001 | |
| WO | 2006-061980 A1 | 6/2006 | |

OTHER PUBLICATIONS

English_Language Translation, Written Opinion of the International Search Authority (PCT/ISA/237) prepared for PCT/JP2006/321605, May 17, 2008.*

(Continued)

*Primary Examiner*—David N Spector
(74) *Attorney, Agent, or Firm*—Cantor Colburn LLP

(57) ABSTRACT

A display element that excels in electrode durability. This display element is one having opposed electrodes and, interposed therebetween, an electrolyte containing either silver or a compound containing silver in its chemical structure, the opposed electrodes driven and operated so as to induce dissolution and precipitation of silver, characterized in that of the opposed electrodes, the electrode at a face not lying on an image observation side, after hermetic charging of the electrolyte, is plated with silver with the use of the electrolyte as a silver plating solution.

9 Claims, 1 Drawing Sheet

OTHER PUBLICATIONS

European Search Report for European Patent Application No. 06822562.2-2205 mailed Dec. 15, 2008 with English Translation.

International Search Report for International Application No. PCT/JP2006/321605 mailed Dec. 12, 2006.

* cited by examiner

DISPLAY ELEMENT AND PRODUCTION METHOD THEREOF

CROSS REFERENCE TO RELATED APPLICATIONS

This is a U.S. national stage of application No. PCT/JP2006/321605, filed on 30 Oct. 2006. Priority under 35 U.S.C. §119(a) and 35 U.S.C. §365(b) is claimed from Japanese Application No. 2005-332669, filed 17 Nov. 2005, the disclosure of which is also incorporated herein by reference.

TECHNICAL FIELD

The present invention relates to an electrochromic display element utilizing silver dissolution and deposition and its production method.

BACKGROUND

In recent years, along with enhancement of the operation rate of personal computers, and popularization of network infrastructure, as well as an increase in capacity of data storage and a decrease in its cost, occasions have increasingly occurred in which pieces of information such as documents and images, which have been provided in the form of paper printed matter, are received as simpler electronic information and viewed as received electronic information.

As viewing means for such electronic information, mainly employed are those of light emitting types such as conventional liquid crystal displays and CRTs or recent organic electroluminescence displays. Specifically, when electronic information includes document information, it is required to watch any of the above viewing means for a relatively long period. However, it is hardly stated that the above viewing means are human friendly. It is common knowledge that light emitting type displays result in problems such as eye fatigue due to flicker, inconvenient portability, limitations in reading posture, necessity to look at still images, or an increase in power consumption.

As means to overcome the above drawbacks, are known reflection type displays (having memory function) which utilize outside light and consume no power to maintain images. However, it is difficult to state that due to the following reasons, they exhibit sufficient performance.

Namely, a system employing polarizing plates, such as a reflection type liquid crystal, results in a problem for a white display due to a low reflectance of approximately 40%. In addition, it is difficulty to state that most methods to produce structuring members are simple and easy. Further, polymer dispersion type liquid crystals require high voltage and the contrast of the resulting images is insufficient due to utilizing the difference in refractive indices between organic compounds. Still further, polymer network type liquid crystals result in problems such as application of high voltage and requirement of complicated TFT circuitry to enhance memory capability. Yet further, display elements employing electrophoresis require high voltage of at least 10 V and tend to suffer insufficient durability due to aggregation of electrophoretic particles. Further, electrochromic display elements, though being drivable at a low voltage of at most 3 V, result in insufficient color quality of black and common colors (namely yellow, magenta, cyan, blue, and red) and tend to result in problems such that, in order to secure memory capability, the display cell requires a complicated film structure such as vapor deposition film.

As a display system, which overcomes the drawbacks of each of the above systems, an electrodeposition (hereinafter referred to as ED) system has been known which utilizes dissolution and deposition of metals or salts thereof. ED systems exhibit advantages such as drivability at a low voltage of at most 3 V, a simple cell structure, excellent black and white contrast, or excellent black quality, for which various methods have been disclosed (refer, for example, to Patent Documents 1-3).

The inventors of the present invention conducted detailed investigation of technologies disclosed in each of the above Patent Documents, and came upon the following problems. In conventional technologies, when white pigments were dispersed in an electrolyte, the resulting dispersion stability of the white pigments was insufficient, whereby white display reflectance fluctuated over an elapse of time. Alternatively, when non-woven fabric or filter paper is employed as a white scattering member, difference in the refractive index from organic materials in the electrolyte is small. As a result, problems were found in which white display reflectance was not sufficient, leading to further investigation. As a result, it was found that these problems were solved by arranging porous white scattering materials between counter electrodes. However, it was found that non-uniform thickness of the white scattering layer resulted, depending on the preparation method of the relatively thick white scattering layer, whereby image mottle is formed.

Patent Document 1: U.S. Pat. No. 4,240,716
Patent Document 2: Japan Patent No. 3428603
Patent Document 3: JP-A 2003-241227

SUMMARY OF THE INVENTION

Problem to be Solved by the Invention

In view of the foregoing, the present invention was achieved. An object of the present invention is to provide a display element, which is composed of a simple member structure, is drivable at a low voltage, exhibits high display contrast and high white display reflectance, and minimizes image mottle.

Means for Solving the Problems

The above problems of the present invention were dissolved employing the following embodiments.

1. A display element which comprises, between counter electrodes, an electrolyte which contains silver or compounds containing silver in the chemical structure and of which the counter electrodes are subjected to driving operation so that silver was dissolved and deposited, characterized in that after sealing the electrolyte the electrode at the non-image viewing side among the counter electrodes is subjected to silver plating by employing the electrolyte as a silver plating composition.

2. The display element, described in 1. above, which is characterized in that the aforesaid electrolyte contains at least one of the compounds represented by following Formula (1) or (2), and at least one of the compounds represented by following Formula (3) or (4).

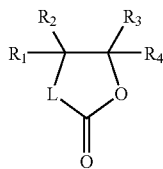

Formula (1)

in the formula, L represents an oxygen atom or $CH_2$, and each of $R_1$-$R_4$ represents a hydrogen atom, an alkyl group, an alkenyl group, an aryl group, a cycloalkyl group, an alkoxyalkyl group, or an alkoxy group.

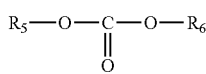

Formula (2)

in the formula, each of $R_5$ and $R_6$ represents a hydrogen atom, an alkyl group, an alkenyl group, an aryl group, a cycloalkyl group, an alkoxyalkyl group, or an alkoxy group.

Formula (3)

in the formula, each of $R_7$ and $R_8$ represents a substituted or unsubstituted hydrocarbon group. When a ring containing an S atom is formed, an aromatic group is not to be included.

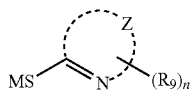

Formula (4)

in the formula, M represents a hydrogen atom, a metal atom, or quaternary ammonium; Z represents a nitrogen-containing heterocyclic ring; n represents an integer of 0 to 5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclic group. When n is at least 2, each $R_9$ may be the same or different and may be joined to form a condensed ring.

3. The display element, described in 1. or 2. above, which is characterized in that the condition specified by following Inequality (1) is satisfied:

$$0 \leq [X]/[Ag] \leq 0.01 \quad \text{Inequality (1)}$$

wherein [X] represents mol concentration (mol/kg) of halogen ions or halogen atoms contained in the above electrolyte, and [Ag] represents total mol concentration (mol/kg) of silver or a compound containing silver in the chemical structure, contained in the aforesaid electrolyte.

4. A production method of the display element described in any one of claims 1 to 3, characterized by, after sealing the electrolyte, applying voltage between the counter electrodes to form a silver plating layer on the counter electrodes.

Advantage of the Invention

According to the present invention, it is possible to provide a display element having electrodes with good durability.

OPTIMAL EMBODIMENT OF THE PRESENT INVENTION

Optimal embodiments to achieve the present invention will now are detailed.

In view of the foregoing, the inventors of the present invention conducted diligent investigation and achieved the present invention by discovering that a display element having durability of electrodes is realized: The display element comprises, between counter electrodes, an electrolyte which contains silver or compounds containing silver in the chemical structure and of which the counter electrodes are subjected to driving operation so that silver was dissolved and deposited, and is characterized in that after sealing the electrolyte the electrode at the non-image viewing side among the counter electrodes is subjected to silver plating by employing the electrolyte as a silver plating composition.

The present invention will now be detailed.

The display element of the present invention is an ED system display element which contains, between counter electrodes, an electrolyte containing silver, or compounds containing silver in the chemical structure, and in which the above counter electrodes are drive-operated to result in dissolution and deposition of silver.

In the display element of the present invention, further, of counter electrodes, after sealing of the electrode, at the non-image viewing side, into an electrolyte, silver plating is carried out employing the above electrolyte as a silver plating composition, whereby significant enhancement of electrode durability is achievable, compared to the case in which after the electrode is subjected to previous silver plating, an electrolyte is sealed.

(Silver or Compound Containing Silver in Chemical Structure)

The term "silver or a compound containing silver in their chemical structure" according to the present invention is the collective term of compounds such as silver oxide, silver sulfide, metallic silver, colloidal silver particles, silver halide, silver complexes, or silver ions. Types of phase states such as a solid state, a solubilized state in liquid, or a gaseous state, as well as types of charged states such as neutral, anionic or cationic are not particularly limited.

(Basic Structure of Display Element)

Figure 1:
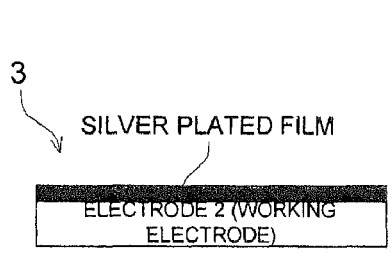
FIG. 1 is a schematic sectional view showing the structure of the display element of the conventional ED method.
Figure 1:
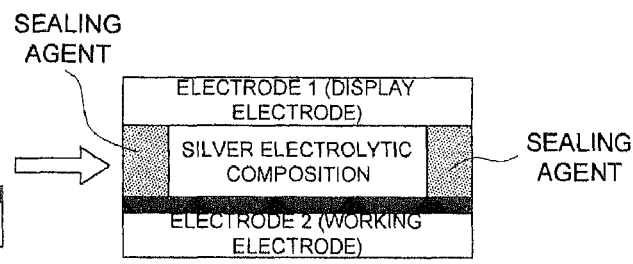

FIG. 1 is a schematic cross-sectional view showing one example of the structure of the display element prepared via a conventional ED method.

As shown in FIG. 1(a), a conventional cell sealing method is that after forming electrode 3 which is prepared by previously providing a silver plated film on the surface of electrode 2 (a working electrode), as shown in FIG. 1(b), electrode 3 and electrode 1 (a display electrode) having a transparent electrode on the image viewing side are arranged to face each other, and the edge portions are sealed via sealing agents, whereby the cell is sealed under a structure so that an electrolytic solution fills the space between the electrodes. By applying voltage to the electrodes, silver ions of the electrolytic solution are deposited onto electrode 1 to form images, while by applying reverse voltage to those, images are eliminated. It is possible to observe images via light reflected from a white reflective layer in the electrolytic solution.

While repeating the above operation (image recording and elimination), the silver plated film on electrode 2 undergoes repeated dissolution and deposition, whereby the following problems have occurred. The electrode erodes, resulting in degradation of image display performance and finally disconnection results.

Further, when electrode 2 comes into contact with sealing agents, a problem has occurred in which the electrode erodes to resulting in solution leakage.

Figure 2:
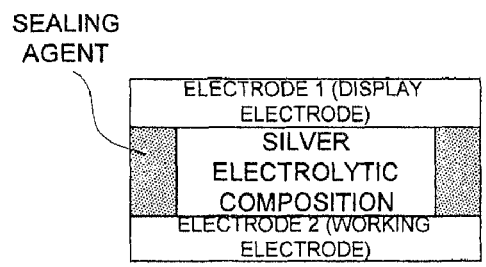
FIG. 2 is a schematic sectional view showing the structure of the display element of the ED method of this invention.
Figure 2:
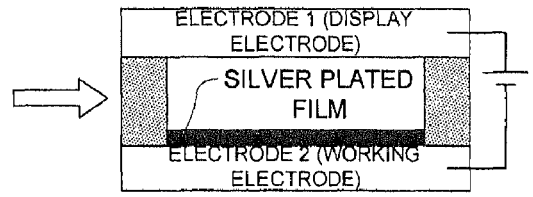

FIG. 2 is a schematic cross-sectional view showing one example of the structure of a display element created via the ED method of the present invention.

The display element of the present invention is formed as follows. As shown in FIG. 2(*a*), electrode 2 is not subjected to pre-treatment and is made to face electrode 1. After sealing edges with sealing agents, a silver electrolytic solution is made to fill the space between electrodes 1 and 2. Subsequently, as shown in FIG. 2(*b*), constant voltage is applied to electrodes 1 and 2, to form a silver plated film on electrode 2, whereby a display element is formed.

By employing the cell forming method of the present invention shown in FIG. 2, it is possible to simplify the cell forming method and to shorten the plating period. Further, by performing the plating process after cell sealing, it is possible to perform a plating process so that non-uniform portions which have been generated during cell formation are eliminated (for example, in an electric field a concentrated position to which over-drive is applied during driving of a display element, a relatively thick plated film is formed via the plating process to enhance durability, whereby it is possible to cancel effects due to any over-drive), whereby it is assumed that durability of the element as whole is enhanced.

(Plating Process)

The present invention is characterized in that of the counter electrodes, the counter electrode on the non-image viewing side is subjected to a silver plating process, employing an electrolyte as a silver plating composition after sealing the electrolyte. It is possible to perform the silver plating process by applying, to the display electrode (electrode 1 in FIG. 2) of the display element, any constant voltage or any constant electric current exhibiting the polarity which eliminates any resulting black silver. In the case of such constant voltage, electric potential difference is preferably in the range of 0.4 to 3.0 V, but is more preferably in the range of 0.8 to 1.8 V. Small electric potential difference is disadvantageous since a relatively longer treatment time is needed. On the other hand, large electric potential difference is also disadvantageous since chemical species incorporated in the electrolyte undergo electrolysis. The application time is preferably 1 second to 5 minutes, but is more preferably 10 seconds to one minute. In the case of a constant electric current, the density thereof is preferably about 0.1 to about 20 mA/cm$^2$. When the display element of the present invention is subjected to voltage drive, it is possible to most preferably employ the plating via constant voltage. Further, such plating process may be performed just prior to the driving operation needed to perform the black display of the display element.

In the present invention, the distance between the counter electrodes is preferably 5 to 45 μm. When the distance is less than 5 μm, the content of white substances to achieve a white display becomes insufficient to result in low contrast, while the distance exceeding 45 μm, is disadvantageous to result in an increase in the plating time and a rise of voltage.

(Compounds Represented by Formulas (1) Through (4))

In the display element of the present invention, it is preferable that the electrolyte contains at least one compound represented by above Formula (1) or (2) and at least one compound represented by above Formula (3) or (4).

Initially, the compounds represented by Formula (1), according to the present invention, will now be described.

In above Formula (1), L represents an oxygen atom or CH$_2$, and each of R$_1$-R$_4$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group. Examples of the aryl group include a phenyl group, and a naphthyl group, while examples of the cycloalkyl group include a cyclopentyl group, and a cyclohexyl group. Examples of the alkoxyalkyl group include a β-methoxymethyl group, a γ-methoxypropyl group, while examples of the alkoxy group include a methoxy group, an ethoxy group, a propyloxy group, a pentyloxy group, a hexyloxy group, an octyloxy group, and a dodecyloxy group.

Specific examples of the compounds represented by Formula (1), according to the present invention, will now be cited, however, the present invention is not limited thereto.

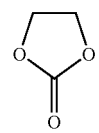

1-1

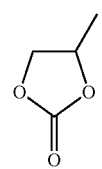

1-2

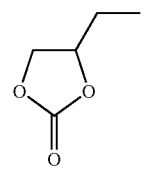

1-3

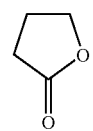

1-4

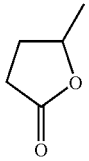

Secondly, the compounds represented by Formula (2), according to the present invention, will now be described.

In above Formula (2), each of $R_5$ and $R_6$ represents a hydrogen atom, an alkyl group, an alkenyl group, an aryl group, a cycloalkyl group, an alkoxyalkyl group, or an alkoxy group.

Examples of the alkyl group include a methyl group, an ethyl group, a propyl group, an isopropyl group, a tert-butyl group, a pentyl group, a hexyl group, an octyl group, a dodecyl group, a tridecyl group, a tetradecyl group, and a pentadecyl group, while examples of the aryl group include a phenyl group, and a naphthyl group, while examples of the cycloalkyl stoup include a cyclopentyl group, and a cyclohexyl group. Examples of the alkoxyalkyl group include a β-methoxymethyl group, a γ-methoxypropyl group, while examples of the alkoxy group include a methoxy group, an ethoxy group, a propyloxy group, a pentyloxy group, a hexyloxy group, an octyloxy group, and a dodecyloxy group.

Specific examples of the compounds represented by Formula (2) according to the present invention will now be listed, however the presented invention is not limited thereto.

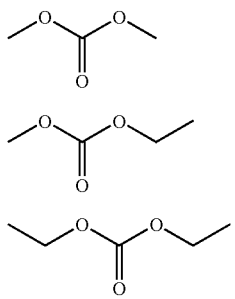

Of the compounds represented by above exemplified Formulas (1) and (2), specifically preferred are Exemplified Compounds (1-1), (1-2), and (2-3).

The compounds represented by Formulas (1) and (2), according to the present invention, belong to one type of electrolyte solvents. Another solvent may simultaneously be employed so that the purpose and effects of the present invention are not adversely affected in the display element of the present invention. Specifically listed are tetramethylurea, sulfolane, dimethylsulfoxide, 1,3-dimethyl-2-imidazolidinone, 2-(N-methyl)-2-pyrrolidinone, hexamethylphosphortriamide, N-methylpropionamide, N,N-dimethylacetamide, N-methylacetamide, N,N-dimethylformamide, N-methylformamide, butyronitrile, propionitrile, acetonitrile, acetylacetone, 4-methyl-2-pentanone, 2-butanol, 1-butanol, 2-propanol, 1-propanol, ethanol, methanol, acetic anhydride, ethyl acetate, ethyl propionate, dimethoxyethane, diethoxyfuran, tetrahydrofuran, ethylene glycol, diethylene glycol, triethylene glycol monobutyl ether, and water. It is preferable to include at least one type of solvent of a solidification point of at most −20° C. and a boiling point of at least 120° C. among these solvents.

Further listed as usable solvents in the present invention may be the compounds described in J. A. Riddick, W. B. Bunger, T. K. Sakano, "Organic Solvents", 4th ed., John Wiley & Sons (1986), Y. Marcus, "Ion Solvation", John Wiley & Sons (1985), C. Reichardt, "Solvents and Solvent Effects in Chemistry", 2nd ed., VCH (1988), G. J. Janz, R. P. T. Tomkins, "Nonaqueous Electrolytes Handbook", Vol. 1, Academic Press (1972).

The electrolyte solvent may be a single variety or a solvent mixture. However preferred is a solvent mixture containing ethylene carbonate in the present invention. The added amount of ethylene carbonate is preferably 10 to 90% by weight with respect to the total electrolyte solvent weight. The specifically preferred electrolyte solvent is the solvent mixture of propylene carbonate/ethylene carbonate at a weight ratio of 7/3 to 3/7. When the ratio of propylene carbonate is more than 7/3, the response rate is lowered due to degradation of ionic conductivity, while when it is less than 3/7, electrolytes tend to deposit at low temperature.

It is preferable to employ the compound represented by above Formula (1) or (2) together with the compound represented by above Formula (3) in the display element of the present invention.

In above Formula (3), $R_7$ and $R_8$ each represent a substituted or unsubstituted hydrocarbon group, which includes an aromatic straight chain group or branched chain group. Further, these hydrocarbon groups may contain at least one of a nitrogen atom, an oxygen atom, a phosphorous atom, a sulfur atom, and a halogen atom. However, when a ring containing an S atom is formed, no aromatic group is employed.

Listed as a substitutable group to the hydrocarbon group may, for example, be an amino group, a guanidino group, a quaternary ammonium group, a hydroxyl group, a halogen compound, a carboxyl group, a carboxylate group, an amido group, a sulfinic acid group, a sulfonic acid group, a sulfate group, a phosphonic acid group, a phosphate group, a nitro group, and a cyano group.

It is necessary to have silver solubilized in an electrolyte in order to result in dissolution and deposition of silver in general. Namely, it is common to employ a method in which silver or silver-containing compound is modified to be soluble compound via coexistence of a compound containing chemical structure species which result in mutual interaction with silver, which forms a coordination bond with silver or forms a weak covalent bond with silver. Known as the above chemical structure species are a halogen atom, a mercapto group, a carboxyl group, an imino group and so on. In the present invention, a thioether group also usefully acts as a silver solvent and exhibits features such as minimal effects to coexisting compounds and high solubility in solvents.

Specific examples of the compounds represented by Formula (3) according to the present invention will now be cited, however the present invention is not limited to the exemplified compounds.

3-1: $CH_3SCH_2CH_2OH$
3-2: $HOCH_2CH_2SCH_2CH_2OH$
3-3: $HOCH_2CH_2SCH_2CH_2SCH_2CH_2OH$
3-4: $HOCH_2CH_2SCH_2CH_2SCH_2CH_2SCH_2CH_2OH$
3-5: $HOCH_2CH_2SCH_2CH_2OCH_2CH_2OCH_2CH_2SCH_2CH_2OH$
3-6: $HOCH_2CH_2OCH_2CH_2SCH_2CH_2SCH_2CH_2OCH_2CH_2OH$
3-7: $H_3CSCH_2CH_2COOH$
3-8: $HOOCCH_2SCH_2COOH$ 3-9: HOOCCH$_2$CH$_2$SCH$_2$CH$_2$COOH 3-10: HOOCCH$_2$SCH$_2$CH$_2$SCH$_2$COOH 3-11: HOOCCH$_2$SCH$_2$CH$_2$SCH$_2$CH$_2$SCH$_2$CH$_2$SCH$_2$COOH 3-12: HOOCCH$_2$CH$_2$SCH$_2$CH$_2$SCH$_2$CH(OH)CH$_2$SCH$_2$CH$_2$SCH$_2$CH$_2$COOH 3-13: HOOCCH$_2$CH$_2$SCH$_2$CH$_2$SCH$_2$CH(OH)CH(OH)CH$_2$SCH$_2$CH$_2$SCH$_2$CH$_2$COOH 3-14: H$_3$CSCH$_2$CH$_2$CH$_2$NH$_2$ 3-15: H$_2$NCH$_2$CH$_2$SCH$_2$CH$_2$NH$_2$ 3-16: H$_2$NCH$_2$CH$_2$SCH$_2$CH$_2$SCH$_2$CH$_2$NH$_2$ 3-17: H$_3$CSCH$_2$CH$_2$CH(NH$_2$)COOH 3-18: H$_2$NCH$_2$CH$_2$OCH$_2$CH$_2$SCH$_2$CH$_2$SCH$_2$CH$_2$OCH$_2$CH$_2$NH$_2$ 3-19: H$_2$NCH$_2$CH$_2$SCH$_2$CH$_2$OCH$_2$CH$_2$OCH$_2$CH$_2$SCH$_2$CH$_2$NH$_2$ 3-20: H$_2$NCH$_2$CH$_2$SCH$_2$CH$_2$SCH$_2$CH$_2$SCH$_2$CH$_2$SCH$_2$CH$_2$NH$_2$ 3-21: HOOC(NH$_2$)CHCH$_2$CH$_2$SCH$_2$CH$_2$SCH$_2$CH$_2$CH(NH$_2$)COOH 3-22: HOOC(NH$_2$)CHCH$_2$SCH$_2$CH$_2$OCH$_2$CH$_2$OCH$_2$CH$_2$SCH$_2$CH(NH$_2$)COOH 3-23: HOOC(NH$_2$)CHCH$_2$OCH$_2$CH$_2$SCH$_2$CH$_2$SCH$_2$CH$_2$OCH$_2$CH(NH$_2$)COOH 3-24: H$_2$N(O=)CCH$_2$SCH$_2$CH$_2$OCH$_2$CH$_2$OCH$_2$CH$_2$SCH$_2$C(=O)NH$_2$ 3-25: H$_2$N(O=)CCH$_2$SCH$_2$CH$_2$SCH$_2$C(O=)NH$_2$ 3-26: H$_2$NHN(O=)CCH$_2$SCH$_2$CH$_2$SCH$_2$C(=O)NHNH$_2$ 3-27: H$_3$C(O=)NHCH$_2$CH$_2$SCH$_2$CH$_2$SCH$_2$CH$_2$NHC(=O)CH$_3$ 3-28: H$_2$NO$_2$SCH$_2$CH$_2$SCH$_2$CH$_2$SCH$_2$CH$_2$SO$_2$NH$_2$ 3-29: NaO$_3$SCH$_2$CH$_2$CH$_2$SCH$_2$CH$_2$SCH$_2$CH$_2$CH$_2$SO$_3$Na 3-30: H$_3$CSO$_2$NHCH$_2$CH$_2$SCH$_2$CH$_2$SCH$_2$CH$_2$NHO$_2$SCH$_3$ 3-31: H$_2$N(NH)CSCH$_2$CH$_2$SC(NH)NH$_2$·2HBr 3-32: H$_2$N(NH)CSCH$_2$CH$_2$OCH$_2$CH$_2$OCH$_2$CH$_2$SC(NH)NH$_2$·2HCl 3-33: H$_2$N(NH)CNHCH$_2$CH$_2$SCH$_2$CH$_2$SCH$_2$CH$_2$NHC(NH)NH$_2$·2HBr 3-34: [(CH$_3$)$_3$NCH$_2$CH$_2$SCH$_2$CH$_2$SCH$_2$CH$_2$N(CH$_3$)$_3$]$^{2+}$·2Cl$^-$ 3-35
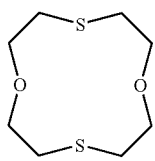

3-36
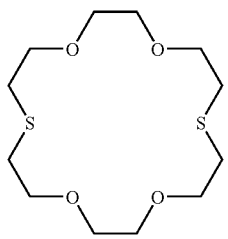

-continued 3-37
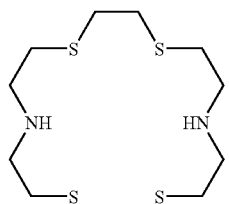

3-38
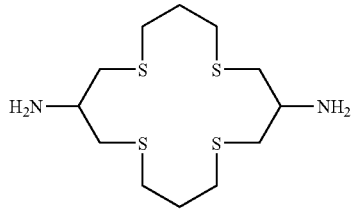

3-39
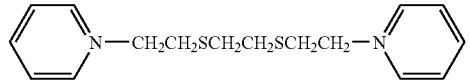

3-40

3-41
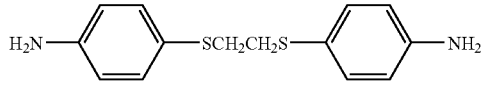

3-42
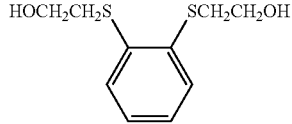

3-43
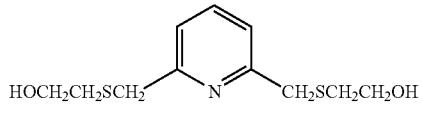

3-44
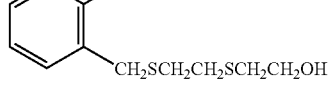

3-45
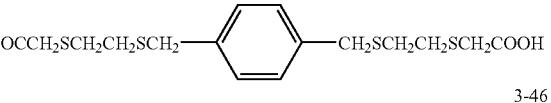

3-46
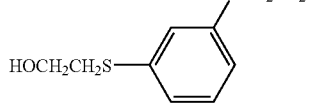

3-47
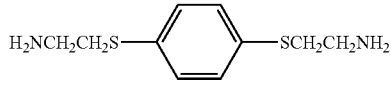

Compound 3-2 is specifically preferred among the above exemplified compounds in view of realizing the purposes and effects of the present invention.

The compounds represented by Formula (4) according to the present invention will now be described.

In above Formula (4), M represents a hydrogen atom metal atom or quaternary ammonium; Z represents a nitrogen-containing heterocyclic ring except for imidazole rings; n represents an integer of 0 to 5; R4 represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclyl group. When n represent at least 2, each $R_4$ may be the same or different, and may be joined to form a condensed ring.

Examples of metal atoms represented by M of Formula (4) include Li, Na, K, Mg, Ca, Zn, and Ag, and examples of quaternary ammonium include $NH_4$, $N(CH_3)_4$, $N(C_4H_9)_4$, $N(CH_3)_3C_{12}H_{25}$, $N(CH_3)_3C_{16}H_{33}$, and $N(CH_3)_3CH_2C_6H_5$.

Examples of the nitrogen-containing heterocyclic rings represented by Z of Formula (4) include a tetrazole ring, a triazole ring, an imidazole ring, an oxadiazole ring, a thiadiazole ring, an indole ring, an oxazole ring, a benzoxazole ring, a benzimidazole ring, a benzothiazole ring, a benzoselenazole ring, and a naphthoxazole ring.

Examples of the halogen atoms represented by $R_9$ of Formula (4) include a fluorine atom, a chlorine atom, a bromine atom and a iodine atom; examples of the alkyl groups include a methyl group, an ethyl group, a propyl group, an i-propyl group, a butyl group, a t-butyl group, a pentyl group, a cyclopentyl group, a hexyl group, a cyclohexyl group, an octyl group, a dodecyl group, a hydroxyethyl group, a methoxyethyl group, a trifluoromethyl group, and a benzyl group; examples of the aryl group include a phenyl group and a naphthyl group; examples of the alkylcarbonamido group include an acetylamino group, a propionylamino group, and a butyroylamino group; examples of the arylcarbonamido group include a benzoylamino group; examples of the alkylsulfonamido group include a methanesulfonylamino group and an ethanesulfonylamino group; examples of the arylsulfonamido group include a benzenesulfonylamino group and a toluenesulfonylamino group; examples of the aryloxy group include a phenoxy group; examples of the alkylthio group include a methylthio group, an ethylthio group, and a butylthio group; examples of the arylthio group include a phenylthio group and a tolylthio group; examples of the alkylcarbamoyl group include a methylcarbamoyl group, a dimethylcarbamoyl group, an ethylcarbamoyl group, a diethylcarbamoyl group, a dibutylcarbamoyl group, a piperidylcarbamoyl group, and a morphorylcarbamoyl group; examples of the arylcarbamoyl group include a phenylcarbamoyl group, a methylphenylcarbamoyl group, an ethylphenylcarbamoyl group, and a benzylphenylcarbamoyl group; examples of the alkylsulfamoyl group include a methylsulfamoyl group, a dimethylsulfamoyl group, an ethylsulfamoyl group, a diethylsulfamoyl group, a dibutylsulfamoyl group, a piperidylsulfamoyl group, and a morphorylsulfamoyl group; examples of the arylsulfamoyl group include a phenylsulfamoyl group, a ethylphenylsulfamoyl group, an ethylphenylsulfamoyl group, and a benzylphenylsulfamoyl group; examples of the alkylsulfonyl group include a methanesulfonyl group and an ethanesulfonyl group; examples of the arylsulfonyl group include a phenylsulfonyl group, a 4-chlorophenylsulfonyl group, and a p-toluenesulfonyl group; examples of the alkoxycarbonyl group include a methoxycarbonyl group, an ethoxycarbonyl group, and a butoxycarbonyl group; examples of the aryloxycarbonyl group include a phenoxycarbonyl group; examples of the alkylcarbonyl group include an acetyl group, a propionyl group, and a butyroyl group; examples of the arylcarbonyl group include a benzoyl group and an alkylbenzoyl group; examples of the acyloxy group include an acetyloxy group, a propionyloxy group, and a butyroyloxy group; examples of the heterocyclyl group include an oxazole ring, a thiazole ring, a triazole ring, a selenazole ring, a tetrazole ring, an oxadiazole ring, a thiadiazole ring, a thiazine ring, a triazine ring, a benzoxazole ring, a benzothiazole ring, an indolenine ring, a benzoselenazole ring, a naphthothiazole ring, a triazaindolizine ring, a diazaindolizine ring, and a tetraazaindolizine ring. These substituents include those which have a substituent.

Specific examples of the preferred compounds represented by Formula (4) will now be cited, however the present invention is not limited these compounds.

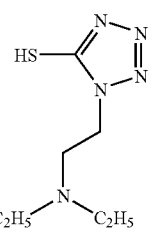

4-1

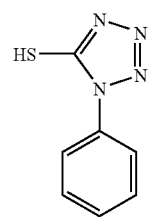

4-2

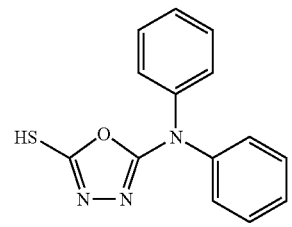

4-3

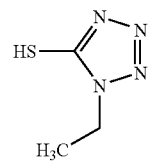

4-4

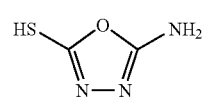

4-5

-continued 4-6 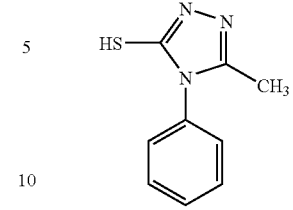

4-7 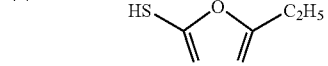

4-8 

4-9 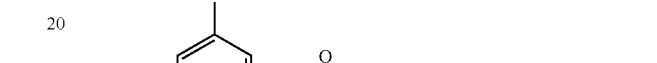

4-10 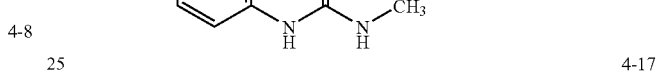

-continued 4-14 

4-15 

4-16 

4-17 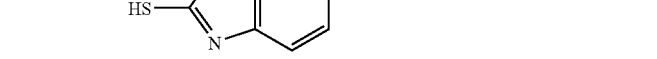

4-18 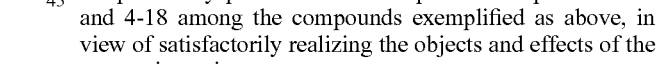

4-19 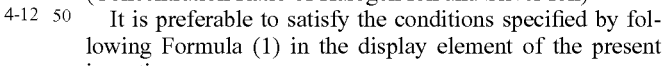

Specifically preferred are Exemplified Compounds 4-12 and 4-18 among the compounds exemplified as above, in view of satisfactorily realizing the objects and effects of the present invention.

(Concentration Ratio of Halogen Ion and Silver Ion)

It is preferable to satisfy the conditions specified by following Formula (1) in the display element of the present invention:

$$0 \leq [X]/[Ag] \leq 0.01 \qquad \text{Formula (1)}$$

Halogen atoms, as described in the present invention refer to any of the iodine, chloride, bromine, and fluorine atoms. When [X]/[Ag] is at least 0.01, during oxidation-reduction reaction of silver, $X^- \rightarrow X_2$ occurs. This reaction becomes one of the factors in which $X_2$ easily undergoes cross oxidation with blackened silver to dissolve blackened silver, resulting in a decrease in memory capability. Consequently, it is preferable that the mol concentration of halogen atoms is as low as possible with respect to the mol concentration of silver. In the present invention, $0 \leq [X]/[Ag] \leq 0.001$ is more preferred. When halogen ions are added, in view of enhancement of memory capability, the sum of mol concentration of each of the halogen species is [I]<[Br]<[Cl]<[F].

-continued 4-11 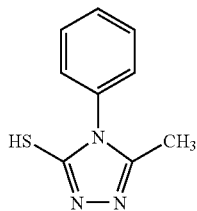

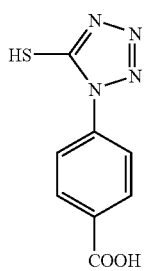

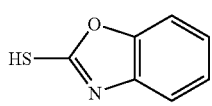

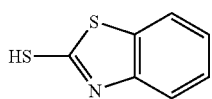

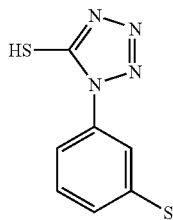

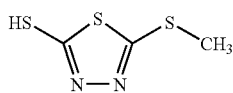

4-12 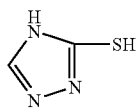

4-13 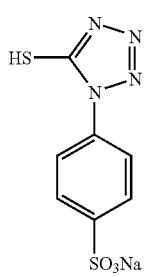

(Electrolyte—Silver Salt)

In the display element of the present invention, employed may be known silver compounds such as silver iodide, silver chloride, silver bromide, silver oxide, silver sulfide, silver citrate, silver acetate, silver behenate, silver trifluoromethane sulfonate, silver p-toluenesulfonate, silver salts of mercapto compounds, and silver complexes of iminodiacetic acids. Of these, it is preferable to employ silver salts which have no nitrogen atom exhibiting coordination capability with halogen, carboxylic acid, and silver, and for example, preferred is silver p-toluenesulfonate.

Silver ion concentration in the electrolyte according to the present invention is preferably 0.2 mol/kg$\leq$[Ag]$\leq$2.0 mol/kg. When the silver ion concentration is at most 0.2 mol/kg, a diluted silver solution is formed to lower the driving rate, while when it exceeds 2 mol/kg, solubility is degraded to tend to result in inconvenience of deposition during storage at low temperature.

(Porous White Scattering Materials)

The display element of this invention may have porous scattering layer, which is formed by coating and drying an aqueous mixture of aqueous polymers substantially insoluble in the electrolyte solvents and a white pigment.

White pigments applicable to this invention include, for example, titanium dioxide (anatase or rutile type), barium sulfate, calcium carbonate, aluminum oxide, zinc oxide, magnesium oxide and zinc hydroxide, magnesium hydroxide, magnesium phosphate, hydrogen magnesium phosphate, alkaline earth metal salt, talc, kaolin, zeolite, acid clay, glass; organic compounds such as polyethylene, polystyrene, acrylic resin, ionomer, ethylene-vinyl acetate copolymer resin, benzo guanamine resin, urea-formalin resin, melamine-formalin resin, polyamide resin. These are used singly or mixture, or in a particle state which has voids changing index of reflectance.

Titanium dioxide, zinc oxide, zinc hydroxide are preferably employed among the white particles mentioned above in this invention. Further, employed as titanium oxide may be titanium oxide which has been subjected to a surface treatment employing an inorganic oxide (such as $Al_2O_3$, AlO(OH), or $SiO_2$), or titanium oxide which has been subjected to a treatment employing an organic compound such as trimethylolethane, triethanolamine acetic acid salts, or trimethylcyclosilane, in addition to the above surface treatment.

It is preferable to employ titanium oxide or zinc oxide in view of preventing staining at high humidity and reflectance due to index of refraction among these white particles.

Listed as an aqueous polymer which is substantially insoluble in electrolyte solvent according to the present invention may be water-soluble polymer and polymer which dispersed in water based solvent.

A water-soluble compound applicable to the present invention includes a natural compound such as proteins, including gelatin or gelatin derivatives, cellulose derivatives, starch, gum Arabic, dextran, Pullulan, or carrageenan, as well as synthetic polymer compounds such as polyvinyl alcohol, polyvinyl pyrrolidone, or acrylamide polymers and derivatives thereof. Gelatin derivatives include acetylated gelatin and phthalated gelatin. Polyvinyl alcohol derivatives include terminal alkyl group-modified polyvinyl alcohol and terminal mercapto group-modified polyvinyl alcohol. Cellulose derivatives include hydroxyethyl cellulose, hydroxypropyl cellulose, and carboxymethyl cellulose. Further, employed may be compounds described in Research Disclosure and on pages 71-75 of JP-A S64-13546, and high water absorptive polymers such as homopolymers of vinyl monomers having —COOM or —$SO_3$M (M being a hydrogen atom or an alkaline metal) and copolymers of these vinyl monomer or copolymers of these vinyl monomers and other vinyl monomers (for example, sodium methacrylate, ammonium methacrylate, and potassium acrylate), described in U.S. Pat. No. 4,960,681 and JP-A S62-245260. Two or more these binders may be employed in combination.

Preferably employed may be gelatin and derivatives thereof, or polyvinyl alcohol and derivatives thereof in the present invention.

Listed as polymers dispersed in water based solvents may be latexes such as natural rubber latex, styrene butadiene rubber, butadiene rubber, nitrile rubber, chloroprene rubber, isoprene rubber; heat curable resins which are prepared by dispersing, in water based solvents, polyisocyanate based, epoxy based, acryl based, silicone based, polyurethane based, urea based, phenol based, formaldehyde based, epoxy-polyamide based, melamine based, or alkyd based resins, or vinyl based resins. Of these polymers, it is preferable to employ water based polyurethane resins described in JP-A H10-76621.

"Being substantially insoluble in electrolyte solvents", as described in the present invention, is defined as a state in which the dissolved amount per kg of the electrolyte solvents is 0 to 10 g in the temperature range of −20 to 120° C. It is possible to determine the above dissolved amount employing the methods known in the art, such as a weight measuring method, or a component quantitative method utilizing liquid chromatogram and gas chromatogram.

The aqueous mixture of water based compounds and white pigment is preferably that the white pigment is dispersed in water based by dispersion methods known in the art. The mixing ratio of water based compounds/white pigment is preferably in the range of 1 to 0.01 in terms of volume ratio, but is more preferably in the range of 0.3 to 0.05.

Media to coat the aqueous mixture of the water based compounds according to the present invention and white pigment may be located anywhere as long as they are located on the structural components between the counter electrodes of the display element. However, it is preferable that they are provided on at least one of the above counter electrodes. Examples of media providing methods include a coating system, a liquid spraying system, a spraying method via a gas phase, such as a system which jets liquid droplets employing vibration of a piezoelectric element such as a piezoelectric system ink-jet head, a BUBBLE JET (registered trade name) ink-jet head which ejects liquid droplets employing a thermal head utilizing bumping, and a spray system in which liquid is sprayed via air or liquid pressure.

An appropriate coating system may be selected from any of the coating systems known in the art, and examples thereof include an air doctor coater, a blade coater, a rod coater, a knife coater, a squeeze coater, an impregnation coater, a reverse roller coater, a transfer roller coater, a curtain coater, a double roller coater, a slide hopper coater, a gravure coater, a kiss roller coater, a bead coater, a spray coater, a calender coater, and an extrusion coater.

Methods to dry the aqueous mixture of water based compounds and titanium oxide provided on the medium according to the present invention are not particularly limited as long as they facilitate water evaporation. Examples thereof include heating employing a heating source, a heating method employing infrared radiation, and a heating method utilizing electromagnetic induction. Further, water evaporation may be performed under reduced pressure.

Porosity refers to the following state. After forming porous white scattering materials by applying the above aqueous mixture of the water based compounds and titanium oxide on the electrode(s) and subsequently drying the resulting coating, an electrolyte containing silver or compounds containing silver in their chemical structure is provided onto the resulting scattering material, followed by sandwiching employing the counter electrodes. The above state is such that when electric potential is applied between the resulting counter electrodes, it is possible to undergo silver dissolution and deposition reaction, and refers to a penetration state in which ion species are movable between the electrodes.

It is preferable that the water based compounds undergo a hardening reaction employing hardening agents during coating and drying of the above aqueous mixture or after drying of the same in the display element of the present invention.

Examples of hardening agents employed in the present invention include those described in the column 41 of U.S. Pat. No. 4,678,739, U.S. and U.S. Pat. No. 4,791,042, as well as JP-A S59-116655, S62-245261, S61-18942, S61-249054, S61-245153, and H04-218044. Specific hardening agents include aldehyde based hardening agents such as formaldehyde, aziridine based hardening agents, epoxy based hardening agents, vinylsulfon based hardening agents such as N,N'-ethylene-bis(vinylsulfonylacetamido)ethane, N-methylol based hardening agents such as dimethylolurea, boric acid, and polymer hardening agents such as a compound described in JP-A S62-234157. When gelatin is employed as a water based compound, of the above hardening agents, it is preferable to employ vinylsulfon type hardening agents and chlorotriazine type hardening agents, individually or in combinations. Further, when polyvinyl alcohol is employed, it is preferable to employ boron-containing compounds such as boric acid or metaboric acid.

The employed amount of these hardening agents is commonly 0.001 to 1 g per g of the water based compounds, but is preferable 0.005 to 0.5 g. It is possible to employ a heat treatment and to regulate humidity during the hardening reaction in order to increase layer strength.

(Electron Insulating Layer)

Electron insulating layer may be provided in the display element of this invention. The electron insulating layer may be a layer which has ion conductivity as well as electron insulation. Examples include a solid electrolyte film made of polymer or salt having polar group, a quasi-solid electrolyte film carrying electrolyte in voids of porous film with high electron insulation, polymer porous film having voids, and a porous inorganic material having low dielectric constant such as a silicon containing compound.

(Electrolyte Materials)

In the display element of the present invention the electrolyte may contain the following compounds when the electrolyte is liquid. Listed as potassium compounds are KCl, KI, and KBr, as lithium compounds are $LiBF_4$, $LiClO_4$, $LiPF_6$, and $LiCF_3SO_3$, and as tetraalkylammonium compounds are tetraethylammonium perchlorate, tetrabutylammonium perchlorate, tetraethylammonium borofluoride, tetrabutylammonium borofluoride, and tetrabutylammonium halide. Further, it is possible to preferably employ a molten salt electrolytic composition described in Paragraphs [0062]-[0081] of JP-A 2003-187881. Further, it is possible to employ compound, which becomes an oxidation-reduction pair such as $I^-/I_3^-$, $Br^-/Br_3^-$, or quinone/hydroquinone.

Further, the electrolyte may contain the following compounds exhibiting electronic conductivity and ionic conductivity, when a supporting electrolyte is solid.

Such compounds include a vinyl fluoride based polymer containing perfluorosulfonic acid, polythiophene, polyaniline, polypyrrole, triphenylamines, polyvinyl carbazoles, polymethylphenylsilanes, chalcogenides such as $Cu_2S$, $Ag_2S$, $Cu_2Se$, or $AgCrSe_2$, fluorine-containing compounds such as $CaF_2$, $PbF_2$, $SrF_3$, $LaF_3$, $TlSn_2F_5$, or $CeF_3$, Li salts such as $Li_2SO_4$, $Li_4SiO_4$, or $Li_3PO_4$, $ZrO_2$, $CaO$, $Cd_2O_3$, $HfO_2$, $Y_2O_3$, $Nb_2O_5$, $WO_3$, $Bi_2O_3$, AgBr, AgI, CuCl, CuBr, CuBr, CuI, LiI, LiBr, LiCl, $LiAlCl_4$, $LiAlF_4$, AgSBr, $C_5H_5NHAg_5I_6$, $Rb_4Cu_{16}I_7Cl_{13}$, $Rb_3Cu_7Cl_{10}$, LiN, $Li_5NI_2$ and $Li_6NBr_3$.

Further, it is possible to employ a gel-like electrolyte as a supporting electrolyte. When the electrolyte is non-aqueous, it is possible to employ oil gelling agents described in Paragraphs [0057]-[0059] of JP-A H11-185836.

(Thickener Added to Electrolyte)

It is possible to simultaneously employ a thickener known in the art along with a polysaccharide thickener according to the present invention in the display element of the present invention, as for as the objects and effects of the present invention are not adversely affected. Examples thereof include gelatin, gum Arabic, poly(vinyl alcohol), hydroxyethyl cellulose, hydroxypropyl cellulose, cellulose acetate, cellulose acetate butyrate, poly(vinylpyrrolidone), poly(alkylene glycol), casein, starch, poly(acrylic acid), poly(methylmethacrylic acid), poly(vinyl chloride), poly(methacrylic acid), copoly(styrene-maleic anhydride), copoly(styrene-acrylonitrile), copoly(styrene-butadiene), poly(vinyl acetals), such as poly(vinyl formal and poly(vinyl butyral), poly(esters), poly(urethanes), phenoxy resins, poly(vinylidene chloride), poly(epoxides), poly(carbonates), poly(vinyl acetate), cellulose esters, poly(amides). Hydrophobic transparent binders include polyvinyl butyral, cellulose acetate, cellulose acetate butyrate, polyester, polycarbonate, polyacrylic acid, and polyurethane.

These thickeners may be employed in combinations of at least two types. Further listed may be the compounds described on pages 71-75 of JP-A S64-13546. In view of enhancement of compatibility with various additives and dispersion stability of white particles, of these, preferably employed compounds include polyvinyl alcohols, polyvinylpyrrolidones, hydroxypropyl celluloses, and polyalkylene glycols.

(Other Additives)

Constituting layers of the display element of the present invention may include subsidiary layers such as a protective layer, a filter layer, an antihalation layer, a cross-over light cutting layer, or a backing layer. If desired, may be incorporated in these subsidiary layers are various types of chemical sensitizers, noble metal sensitizers, sensitizing dyes, supersensitizing dyes, couplers, high-boiling point solvents, antifoggants, stabilizers, development restrainers, bleach accelerators, fixing accelerators, color mixing inhibitors, formalin scavengers, toning agents, hardeners, surface active agents, thickeners, plasticizers, lubricants, UV absorbers, anti-irradiation dyes, filter light absorbing dyes, fungicides, polymer latexes, heavy metals, antistatic agents, and matting agents.

These additives, described above, are detailed in Research Disclosure (hereinafter referred to as RD), Volume 176 Item/17643 (December 1978), Volume 184 Item/18431 (August 1979), Volume 187 Item/18716 (November 1979), and Volume 308. Item/308119 (December 1989).

Types and listed positions of the compounds cited in these three Research Disclosures are described below.

| Additive | RD 17643 Page & Class | RD 18716 Page & Class | RD 308119 Page & Class |
|---|---|---|---|
| Chemical Sensitizer | 23 III | 648 upper right | 96 III |
| Sensitizing Dye | 23 IV | 648-649 | 996-998 IV |
| Desensitizing Dye | 23 IV | | 998 IV |
| Dye | 25-26 VIII | 649-650 | 1003 VIII |
| Development Accelerator | 29 XXI | 648 upper right | |
| Antifoggant, Stabilizer | 24 IV | 649 upper right | 1006-1007 VI |
| Whitening Agent | 24 V | | 998 V |
| Hardener | 26 X | 651 upper left | 1004-5 X |
| Surface Active Agent | 26-27 XI | 650 right | 1005-1006 XI |
| Antistatic Agent | 27 XII | 650 right | 1006-1007 XIII |
| Plasticizer | 27 XII | 650 right | 1006 XII |
| Lubricant | 27 XII | | |
| Matting Agent | 28 XVI | 650 right | 1008-1009 XVI |
| Binder | 26 XXII | | 1003-1004 IX |
| Support | 28 XVII | | 1009 XVII |

(Layer Configuration)

Constitution layers between the counter electrodes of the display element of the present invention will further be described.

It is possible to provide a constitution layer containing a positive hole transporting material as the constitution layer related to the display element of the present invention. Examples of positive hole transporting materials include aromatic amines, triphenylene derivatives, oligothiophene compounds, polypyrroles, polyacetylene derivatives, polyphenylene vinylene derivatives, polythienylene vinylene derivatives, polythiophene derivatives, polyaniline derivatives, polytoluidine derivatives, CuI, CuSCN, $CuInSe_2$, Cu(In,Ga)Se, $CuGaSe_2$, $Cu_2O$, CuS, $CuGaS_2$, $CuInS_2$, GaP, NiO, CoO, FeO, $Bi_2O_3$, $MoO_2$, and $Cr_2O_3$.

(Substrates)

Preferably employed as substrates usable in the present invention may be synthetic plastic films composed, for example, of polyolefins such as polyethylene or polypropylene, polycarbonates, cellulose acetate, polyethylene terephthalate, polyethylenedinaphthalene dicarboxylate, polyethylene naphthalates, polyvinyl chloride, polyimide, polyvinyl acetals, or polystyrene. Further, preferred are syndiotactic-structured polystyrenes. It is possible to obtain these employing the methods described, for example, in JP-A S62-117708, JP-A H01-46912, and JP-A H01-178505. Further listed are metal substrates of stainless steel, paper supports such as baryta paper or resin-coated paper, supports composed of the above plastic film having thereon a reflection layer, and those described, as a support, in JP-A S62-253195 (pages 29-31) It is possible to preferably employ those described on page 28 of RD No. 17643, from the light column on page 647 to the left column on page 648 of RD No. 18716, and on page 879 of RD No. 307105. As described in U.S. Pat. No. 4,141,735, these supports may be subjected to a thermal treatment at a temperature below Tg so that core-set curl is minimized. Further, the surface of these supports may be subjected to a surface treatment for the purpose of enhancement of adhesion of the support to another constitution layer. In the present invention employed as a surface treatment may be a glow discharge treatment, an ultraviolet radiation treatment, a corona treatment, and a flame treatment. Further employed may be supports described on pages 44-149 of Kochi Gijutsu (Known Technology) No. 5 (published by AZTEC Japan, Mar. 22, 1991). Further listed are those described on page 1009 of RD No. 308119, as well as in the item "Supports" on page 108 of Product Licensing Index Volume 92. Other than the above, employed may be glass substrates and epoxy resins kneaded with glass powder.

(Electrode)

It is preferable that at least one of the counter electrodes is a metal electrode in the display element of the present invention. Employed as a metal electrode may be metals such as platinum, gold, silver, copper, aluminum, zinc, nickel, titanium, or bismuth, as well as alloys thereof, which are known in the art. Preferred metals employed in the metal electrodes are those which exhibit a work function near the oxidation-reduction potential of silver in the electrolyte. Of these, a silver electrode or an electrode composed of silver in an amount of at least 80% is advantageous to maintain reduced silver, and further, results in anti-staining of electrodes. Employed as a method to prepare the electrodes may be conventional ones such as an evaporation method, a printing method, an ink-jet printing method, a spin coating method, or a CVD method.

Further, it is preferable that in the display element of the present invention, at least one of the counter electrodes is transparent. Transparent electrodes are not particularly limited as long as they are transparent and electrically conductive. Examples thereof include indium tin oxide (ITO), indium zinc oxide (IZO), fluorine-doped tin oxide (FTO), indium oxide, zinc oxide, platinum, gold, silver, rhodium, copper, chromium, carbon, aluminum, silicon, amorphous silicon, and BSO (bismuth silicon oxide). In order to form electrodes, as described above, for example, an ITO layer may be subjected to mask evaporation on a substrate employing a sputtering method, or after forming an ITO layer on the entire surface, patterning may be performed employing photolithography. The surface resistance value is preferably at most $100\Omega/\square$, but is more preferably at most $10\Omega/\square$. The thickness of the transparent electrode is not particularly limited, but is commonly 0.1 to 20 μm.

(Other Constituting Components of Display Element)

Sealing agents, columnar materials, and spacer particles may be employed in the display element of the present invention, if desired.

Sealing agents are those which perform sealing so that leak to the exterior is minimized, and are called sealants. Employed as sealing agents may be heat curing, light curing, moisture curing, and anaerobic during type resins such as epoxy resins, urethane based resins, acryl based resins, vinyl acetate based resins, en-thiol based resins, silicone based resins, or modified polymer resins.

Columnar materials provide a strong self-supporting capability (strength) between substrates. For example, listed may be a cylindrical form, a quadrangular form, an elliptic from, and a trapezoidal form which are arranged at definite intervals in a specified pattern such as a lattice. Further employed may be stripe-shaped ones arranged at definite intervals. It is preferable that the columnar materials are not randomly arranged but arranged at an equal distance so that the interval gradually varies, or a predetermined pattern is repeated at a definite cycle so that the distance between substrates is nearly maintained and image display is not degraded. When the columnar materials are such that the ratio of the area occupied by the display region of a display element is 1-40%, sufficient strength as a display element for commercial viability is obtained.

Spacers may be provided between paired substrates in order to maintain a uniform gap between them. As such spacers, exemplified may be spheres composed of resins or inorganic oxides. Further suitably employed are adhesion spacers, the surface of which is coated with thermoplastic resins. Columnar materials only may be provided in order to maintain a uniform gap between the substrates. However, both spacers and columnar materials may be provided. Instead of the columnar materials, only spacers may be employed as space-maintaining members. The diameter of spacers, when a columnar material is formed, is at most its height, but is preferably equal to the above height. When no columnar material is formed, the diameter of spacers corresponds to the thickness of the cell gap.

(Screen Printing)

It is possible to form sealing agents, columnar materials, and electrode patterns, employing a screen printing method in the present invention. In screen printing methods, a screen, on which predetermined patterns are formed, is applied onto the electrode surface, and printing materials (compositions to form columnar materials such as light-curing resins) are placed on the screen. Subsequently, a squeegee is moved at a predetermined pressure, angle and rate. By such action, the printing materials are transferred onto the above substrate via the pattern of the screen. Subsequently, the transferred materials are thermally cured and dried. When columnar materials are formed employing the screen printing method, resinous materials are not limited to light-curing resins, but also employed, for example, may be heat curable resins such as epoxy resins or acryl resins, as well as thermoplastic resins. Listed as thermoplastic resins are: polyvinyl chloride resins, polyvinylidene chloride resins, polyvinyl acetate resins, polymethacrylic acid ester resins, polyacrylic acid ester resins, polystyrene resins, polyamide resins, polyethylene resins, polypropylene resins, fluororesins, polyurethane resins, polyacrylonitrile resins, polyvinyl ether resins, polyvinyl ketone resins, polyether resins, polyvinylpyrrolidone resins, saturated polyester resins, polycarbonate resins, and chlorinated polyether resins. It is preferable that resinous materials are employed in the form of a paste, while dissolved in suitable solvents.

As noted above, after forming the columnar materials on the substrate, if desired, a spacer is provided on at least one side of the substrate, and paired substrates are placed so that the electrode forming surfaces face each other, whereby a vacant cell is formed. By heating the paired facing substrates, under application of pressure from both sides, they are adhered to each other, whereby a display cell is obtained. Preparation of a display element may be achieved by injecting an electrolyte composition between the substrates, employing a vacuum injection method. Alternatively, during adhesion of the substrates, an electrolyte composition may be dripped onto the surface of one of the substrates and then a liquid crystal composition is injected simultaneously sealed when the substrates are adhered to each other.

(Method to Drive Display Element)

It is preferable to drive a display element so that blackened silver is deposited via voltage application of at least deposition overvoltage and deposition of blackened silver is allowed to continue via application of voltage lower than the deposition overvoltage in the display element of the present invention. It is possible to lower energy for writing, decrease the driving circuit load, as well as to enhance writing rate by performing the above driving operation. It is common knowledge that during the electrode reaction in the electrochemical field, overvoltage exists. Overvoltage is detailed, for example, on page 121 of "Denshi Ido no Kagaku—Denkikagaku Nyumon (Chemistry of Electron Transfer—Introduction to Electrochemistry)" (1996, published by Asakura Shoten). It is possible to consider that the display element of the present invention undergoes an electrode reaction of an electrode with silver in the electrolyte. Consequently, it easy to understand the presence of overvoltage during silver dissolution and deposition. Since the magnitude of overvoltage is controlled by exchange current density, it is assumed that the fact that as shown in the present invention, after formation of blackened silver, deposition of blackened silver continues via application of voltage lower than the deposition overvoltage, is that the surface of the blackened silver results in less excessive electric energy, whereby it is possible to easily perform electron injection.

Driving operation of the display element of the present invention may be simple matrix driving or active matrix driving. Simple matrix driving, as described in the present invention, refers to the driving method in which electric current is sequentially applied to a circuit in which a positive electrode line containing a plurality of positive electrodes faces a negative electrode line containing a plurality of negative electrodes so that each line intersects in the perpendicular direction. By employing simple matrix driving, it is possible to simplify the circuit structure and the driving IC, resulting in advantages such as lower production cost. Active matrix driving refers to a system in which scanning lines, data lines, and current feeding lines are formed in a checkered pattern and driving is performed by TFT circuits arranged in each of the squares of the checkered pattern. Since it is possible to switch for each pixel, advantages result in gradation as well as memory function. For example, it is possible to employ the circuit described in FIG. 5 of JP-A 2004-29327.

(Applied Products)

It is possible to apply the display element of the present invention to electronic book related fields, ID card related fields, public information related fields, transportation related fields, broadcasting related fields, account settling fields, and distribution and logistics related fields. Specific examples include door keys, student identification cards, employee ID cards, various club membership cards, convenience store cards, department store cards, vending machine cards, gas station cards, subway and railroad cards, bus cards, cash cards, credit cards, highway cards, driver licenses, hospital medical examination cards, health insurance cards, Basic Resident Registers, passports, and electronic books.

EXAMPLES

The present invention will now be specifically described with reference to examples, however the present invention is not limited thereto.

Example 1

Preparation of Display Elements (Preparation of Display Element 1)

(Preparation of Electrolytic Solution 1)

Added to 2.5 g of dimethyl sulfoxide (DMSO) were 90 mg of sodium iodide and 75 mg of silver iodide, which were allowed to completely dissolve. Thereafter, 0.5 g of titanium oxide (at an average particle diameter of 0.27 μm) was added and dispersed via an ultrasonic wave dispersion method. Added to the resulting dispersion was 150 mg of polyvinylpyrrolidone (at an average molecular weight of 15,000), and the resulting mixture was stirred over one hour while heated at 120° C., whereby Electrolytic Solution 1 was prepared.

(Preparation of Electrode 1)

An ITO film, at a pitch of 145 μm and an electrode width of 130 μm, was formed on a 1.5 mm thick 2 cm×4 cm glass substrate via a conventional method, whereby a transparent electrode (namely Electrode 1) was prepared.

(Preparation of Electrodes 2 and 3)

A 0.1 μm thick silver-palladium electrode (namely Electrode 2) at a pitch of 145 μm and an electrode gap of 130 μm was prepared on a 1.5 mm thick 2 cm×4 cm glass substrate employing a conventional method. A pure silver plate and Electrode 2 were arranged to be parallel at a distance of 3 cm in Electrolytic Solution 1, and 1.5 V voltages were applied for 120 seconds while employing Electrode 2 as a negative electrode, to form a silver plated film on Electrode 2, whereby Electrode 3 was prepared.

Preparation of Display Element 1

Comparative Example

The peripheral portion of Electrode 1, except for an open section, was hemmed by an olefin based sealing agent containing spherical glass beads of an average particle diameter of 40 μm at a volume ratio of 10%, and on the above, Electrode 3 was superposed so that electrode sides faced each other, followed by heating and pressing, whereby an empty cell was prepared. Electrolytic Solution 1 was injected through the above open section via a vacuum injection method and the open section was sealed with epoxy based ultraviolet ray-curable resins, whereby Display Element 1 was prepared.

Preparation of Display Element 2

Comparative Example

Display Element 2 was prepared in the same manner as Display Element 1, except that the sodium iodide in Electrolytic Solution 1 of Display Element 1 was replaced with Exemplified Compound (4-12) in the same mol amount.

(Preparation of Display Element 3)

The peripheral portion of Electrode 1, except for an open section was hemmed by an olefin based sealing agent containing spherical glass beads of an average particle diameter of 40 μm at a volume ratio of 10%, and on the above, Electrode 2 was superposed so that electrode sides faced each other, followed by heating and pressing, whereby a empty cell was prepared. Electrolytic Solution 1 was injected through the above open section via a vacuum injection method and the open section was sealed with epoxy based ultraviolet ray-curable resins. Further, 1.5 V voltage was applied over 120 seconds while employing Electrode 2 as a negative electrode so that a silver plated film was formed on Electrode 2, whereby Display Element 3 was prepared.

(Preparation of Display Element 4)

Display Element 4 was prepared in the same manner as Display Element 3, except that the sodium iodide in Electrolytic Solution 1 was replaced with Exemplified Compound (4-12) in the same mol amount.

(Preparation of Display Element 5)

Display Element 5 was prepared in the same manner as Display Element 4, except that Exemplified Compound (4-12) was replaced with Exemplified Compound (3-3) in the same mol amount.

(Preparation of Display Element 6)

Display Element 6 was prepared in the same manner as Display Element 3, except that dimethylsulfoxide was replaced with propylene carbonate.

(Preparation of Display Element 7)

Display Element 7 was prepared in the same manner as Display Element 6, except that the silver iodide was replace with silver bromide in the same mol amount and the sodium iodide was replaced with Exemplified Compound (4-12) in the same mol amount.

(Preparation of Display Element 8)

Display Element 8 was prepared in the same manner as Display Element 5, except that the silver iodide was replaced with silver p-toluenesulfonate in the same mol amount and the dimethylsulfoxide was replaced with propylene carbonate.

(Preparation of Display Element 9)

Display Element 9 was prepared in the same manner as Display Element 8, except that the silver-palladium electrode was replaced with the ITO electrode.

(Preparation of Display Element 10)

Display Element 10 was prepared in the same manner as Display Element 8, except that the silver-palladium electrode was replaced with the copper electrode.

<<Evaluation of Display Elements: Evaluation of Electrode Durability>>

By employing a spectro-colorimeter CM-3700d, produced by Konica Minolta Sensing, Inc., driving conditions were obtained so that the reflection ratio at 550 nm of each of the display elements, prepared as above, exhibited 10%. Under the above conditions, whitening-blackening was driven 1,000 times. Thereafter, blackening was again realized and a blackened image at a square of 300 pixels was captured via a CCD camera. Then, the number of strive electrodes in which the electrode width became at most ¾ (including disconnection) was counted as a degraded electrode and electrode durability was evaluated based on the following criteria.

10: no degraded electrode was noted
9: the number of degraded electrodes was 1-5
8: the number of degraded electrodes was 6-10
7: the number of degraded electrodes was 11-15
6: the number of degraded electrodes was 16-20
5: the number of degraded electrodes was 21-25
4: the number of degraded electrodes was 26-30
3: the number of degraded electrodes was 31-35
2: the number of degraded electrodes was 36-40
1: the number of degraded electrodes was at least 41

Thus obtained evaluation result of the electrode durability is listed in Table 1.

TABLE 1

| Display Element | Evaluation | Remarks |
|---|---|---|
| 1 | 1 | Comparative Example |
| 2 | 1 | Comparative Example |

TABLE 1-continued

| Display Element | Evaluation | Remarks |
|---|---|---|
| 3 | 3 | Present Invention |
| 4 | 4 | Present Invention |
| 5 | 5 | Present Invention |
| 6 | 4 | Present Invention |
| 7 | 5 | Present Invention |
| 8 | 7 | Present Invention |
| 9 | 8 | Present Invention |
| 10 | 7 | Present Invention |

As can clearly be seen from the results in Table 1, display elements constituted as specified by the present invention exhibited excellent electrode durability, compared to the comparative examples.

The invention claimed is:

1. A production method of the display element comprising counter electrodes and an electrolyte comprising silver or a compound containing silver in chemical structure between the counter electrodes, one of the electrodes having a silver plating on a surface facing to the electrolyte at the non-image viewing side among the counter electrodes, the counter electrodes being subjected to driving operation so that silver is dissolved and deposited, and a distance between the counter electrodes being 5 to 45 μm, wherein the method comprises:

sealing the electrolyte between the electrodes, and then, applying voltage of electric potential difference of 0.4 to 3.0 V for 1 second to 5 minutes between the counter electrodes to form the silver plating layer by employing the sealed electrolyte as a silver plating composition.

2. The method of claim 1, wherein the electrolyte comprises at least one of the compounds represented by Formulas (1) or (2), and at least one of the compounds represented by Formulas (3) or (4),

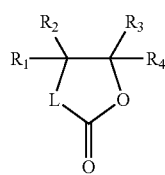

Formula (1)

in the formula, L represents an oxygen atom or $CH_2$, and each of $R_1$-$R_4$ represents a hydrogen atom, an alkyl group, an alkenyl group, an aryl group, a cycloalkyl group, an alkoxyalkyl group, or an alkoxy group,

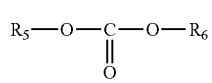

Formula (2)

in the formula, each of $R_5$ and $R_6$ represents a hydrogen atom, an alkyl group, an alkenyl group, an aryl group, a cycloalkyl group, an alkoxyalkyl group, or an alkoxy group,

Formula (3)

in the formula, each of $R_7$ and $R_8$ represents a substituted or unsubstituted hydrocarbon group, provided that when a ring containing an S atom is formed, an aromatic group is not to be included,

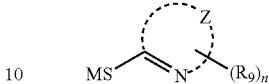

Formula (4)

in the formula, M represents a hydrogen atom, a metal atom, or quaternary ammonium; Z represents a nitrogen-containing heterocyclic ring; n represents an integer of 0 to 5; $R_9$ represents a hydrogen atom, a halogen atom, an alkyl group, an aryl group, an alkylcarbonamido group, an arylcarbonamido group, an alkylsulfonamido group, an arylsulfonamido group, an alkoxy group, an aryloxy group, an alkylthio group, an arylthio group, an alkylcarbamoyl group, an arylcarbamoyl group, a carbamoyl group, an alkylsulfamoyl group, an arylsulfamoyl group, a sulfamoyl group, a cyano group, an alkylsulfonyl group, an arylsulfonyl group, an alkoxycarbonyl group, an aryloxycarbonyl group, an alkylcarbonyl group, an arylcarbonyl group, an acyloxy group, a carboxyl group, a carbonyl group, a sulfonyl group, an amino group, a hydroxyl group, or a heterocyclic group, when n is at least 2, each $R_9$ may be the same or different and may be joined to form a condensed ring.

3. The method of claim 1, wherein a condition specified by Inequality (1) are satisfied:

$$0 \leq [X]/[Ag] \leq 0.01 \qquad \text{Inequality (1)}$$

wherein [X] represents mol concentration (mol/kg) of a halogen ion or a halogen atom contained in the electrolyte, and [Ag] represents total mol concentration (mol/kg) of silver or a compound containing silver in the chemical structure, contained in the electrolyte.

4. The method of claim 1, wherein the electrolyte comprises white pigment.

5. The method of claim 4, wherein the white pigment is titanium dioxide, or zinc oxide or zinc hydroxide.

6. The method of claim 1, wherein the electrolyte comprises an aqueous polymer which is substantially insoluble in electrolyte solvent.

7. The method of claim 6, wherein the electrolyte comprises water-soluble polymer.

8. The method of claim 7, wherein the water-soluble polymer is gelatin, gelatin derivative, polyvinyl alcohol or polyvinyl alcohol derivative.

9. A production method of the display element comprising counter electrodes and an electrolyte comprising silver or a compound containing silver in chemical structure between the counter electrodes, one of the electrodes having a silver plating on a surface facing to the electrolyte at the non-image viewing side among the counter electrodes, and a distance between the counter electrodes being 5 to 45 μm, wherein the method comprises steps of;

sealing the electrolyte between the electrodes, and then, applying voltage of electric potential difference of 0.4 to 3.0 V for 1 second to 5 minutes between the counter electrodes to form the silver plating layer by employing the sealed electrolyte as a silver plating composition.

* * * * *